(12) United States Patent
Kuhn et al.

(10) Patent No.: US 11,466,789 B2
(45) Date of Patent: Oct. 11, 2022

(54) VALVE, METHOD FOR PRODUCING A VALVE, AND DEVICE FOR REGULATING THE PRESSURE OF A FLUID IN A VEHICLE TRANSMISSION, COMPRISING A VALVE DESIGNED AS A PRESSURE COMPENSATION VALVE

(71) Applicant: Schaeffler Technologies AG & Co. KG, Herzogenaurach (DE)

(72) Inventors: Lukas Kuhn, Puschendorf (DE); Horst Hartmann, Aurachtal (DE); Georg Draser, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/298,971

(22) PCT Filed: Nov. 15, 2019

(86) PCT No.: PCT/DE2019/100982
§ 371 (c)(1),
(2) Date: Jun. 2, 2021

(87) PCT Pub. No.: WO2020/114550
PCT Pub. Date: Jun. 11, 2020

(65) Prior Publication Data
US 2022/0049783 A1 Feb. 17, 2022

(30) Foreign Application Priority Data
Dec. 6, 2018 (DE) ...................... 10 2018 131 093.5

(51) Int. Cl.
*F16K 17/04* (2006.01)
*F16H 57/04* (2010.01)
*F16K 27/02* (2006.01)

(52) U.S. Cl.
CPC ..... *F16K 17/0466* (2013.01); *F16H 57/0435* (2013.01); *F16K 27/0209* (2013.01)

(58) Field of Classification Search
CPC ............. F16K 17/0466; F16K 27/0209; F16H 57/0435
See application file for complete search history.

(56) References Cited

U.S. PATENT DOCUMENTS 3,612,099 A * 10/1971 MacManus ......... F16K 17/0466
137/540
3,913,615 A * 10/1975 Cooper ................. F16K 15/028
137/543.19
(Continued)

FOREIGN PATENT DOCUMENTS

DE 1810550 A1 11/1968
DE 3120606 A1 7/1983
(Continued)

*Primary Examiner* — P. Macade Nichols

(57) ABSTRACT

A valve includes a valve housing, a piston, a support element, and a spring. The piston and the valve housing are arranged coaxially to each other on an imaginary valve axis. The piston is received in the valve housing in an axially movable manner against the spring force of the spring. The spring is supported on the support element and on the piston. The valve housing is provided with a first opening through which a fluid can flow and which can be closed by a piston base of the piston. The valve housing is provided with a second opening which can be at least partly closed by a piston casing of the piston and through which the fluid can flow. The piston casing extends outwards from the piston base in the axial direction of the support element and surrounds the valve axis.

19 Claims, 3 Drawing Sheets

(56) References Cited

U.S. PATENT DOCUMENTS

2014/0311596 A1 10/2014 Kim et al.
2016/0047290 A1 2/2016 Clement et al.

FOREIGN PATENT DOCUMENTS

| DE | 0460299 A1 | 12/1990 |
| DE | 19604889 C2 | 8/1997 |
| DE | 202004004609 U1 | 9/2004 |
| DE | 102007035706 A1 | 8/2008 |
| DE | 102007029466 A1 | 1/2009 |
| DE | 102008057393 A1 | 5/2010 |
| DE | 102014213751 A1 | 11/2015 |
| EP | 0460299 A1 | 12/1991 |
| FR | 2817014 A1 | 11/2000 |

\* cited by examiner

VALVE, METHOD FOR PRODUCING A VALVE, AND DEVICE FOR REGULATING THE PRESSURE OF A FLUID IN A VEHICLE TRANSMISSION, COMPRISING A VALVE DESIGNED AS A PRESSURE COMPENSATION VALVE

CROSS-REFERENCE TO RELATED APPLICATIONS

This application is the U.S. National Phase of PCT Appln. No. PCT/DE2019/100982 filed Nov. 15, 2019, which claims priority to DE 10 2018 131 093.5 filed Dec. 6, 2018, the entire disclosures of which are incorporated by reference herein.

TECHNICAL FIELD

The disclosure relates to a valve having a valve housing, at least one piston, at least one support element, and at least one spring.

BACKGROUND

Pressure compensation valves are installed in the oil ducts of transmissions. If the pressure of the transmission oil in the channel rises to or above a defined pressure, a piston of the valve opens an inlet opening. The transmission oil flows through the valve via an outlet opening into a bypass or return channel until the pressure falls below the defined level and the inlet opening is closed again by the piston.

DE 20 2004 004 609 U1 shows a pressure limiting valve which is formed from a valve housing, a piston, a spring, and a support element. The housing, the piston, and the support element are solid components and are correspondingly heavy. The cost of producing these separate parts is relatively high. The first opening is formed on the front of the valve and the second opening, i.e., the return opening, on the rear at the open end of the valve housing. The valve housing is closed by the support element, wherein the support element is pressed into the housing. The press fit of the support element can lead to deformations of the valve housing which adversely affect a secure fit of the valve housing in a component.

SUMMARY

A valve addresses the aforementioned disadvantages.

The second opening is oriented to be transverse to the first opening and is introduced into a valve housing made of sheet metal, preferably by punching. The second opening extends in the axial direction at a radial distance from the valve axis. The center axis of the opening runs in the radial direction perpendicular to the valve axis. The valve housing can be produced easily and inexpensively.

One embodiment provides that the piston is guided to be axially movable in the valve housing and radially centered in the valve housing via the piston casing. This advantageously results in an essentially pressure-tight and at the same time axially movable guidance of the piston in the valve housing, in particular when the radial play with which the piston is centered radially in the housing is very small. The clearance may be 30 µm, for example. Diameters of the sliding surfaces, i.e., the inner cylindrical surface of the valve housing and the outer cylindrical surface of the piston, can be set very precisely when these components are drawn from sheet metal without machining. Sliding coatings on the surfaces of the components can be advantageous.

The piston is guided to be axially movable in the valve housing against the spring forces of the spring from a closed position into an open position. In the closed position of the piston, the first opening is closed by the piston base and the second opening is at least partially closed by the piston casing. In the open position, the piston base has lifted off the valve seat. At least one edge or a contour of the piston releases the second opening analogously to a control edge, so that a connection is formed between the first opening and the second opening which is penetrable to fluid. The open end of the valve housing axially opposite the first opening is sealed off from the fluid in both the closed position and the open position by the piston, subject to a leakage gap caused by radial play through the piston.

A further embodiment provides in this context that the second opening, which in this case is a return opening, is only partially closed by the piston casing already or still in the closed position. This means that a gap-like through opening of the second opening, which is penetrable to fluid, is not covered by the piston casing in the closed position and is not closed by the piston. The gap-like through opening is delimited at least in the closed position by a portion of the piston and an edge of the second opening. The advantage is that immediately after opening the valve, a passage which is penetrable to fluid is formed between the first opening and the second opening and the pressure is quickly reduced. This has an advantageous effect on the design of the spring.

The same effect is achieved if an annular channel is formed between the piston and the valve housing, which is directly connected to the valve seat. The annular channel can be designed as desired through the design of the valve housing and the piston. The annular channel fills with the fluid immediately after the piston lifts off the valve seat. The pressure of the fluid is thereby transposed over a larger area of the piston.

The same effect is also achieved if, as one embodiment provides, the piston base and the piston casing are connected to one another by means of a transition section formed on the piston. An annular channel is delimited by the transition section and by a section of the valve housing opposite the transition section, at least in the closed position.

With one embodiment, a combination of both measures is provided. The annular channel is already open towards the second opening in the closed position of the piston at the gap-like through opening.

From the measures mentioned above, it follows that the pressure that is necessary to open the valve is greater than the pressure that prevails in the valve when the piston has lifted from the valve seat. The advantage of such an arrangement is that values for the opening and closing pressures of the valve can be set to be constant and reliable in the process and the pressure compensation takes place within a very short time.

A further embodiment provides that the valve is provided with a sleeve-like valve housing which has a sleeve casing, oriented concentrically to the valve axis and an edge made of sheet metal that is oriented radially in the direction of the valve axis and extends around the first opening. The edge is optionally provided with a separate valve seat fastened to the edge or the valve seat is punched from sheet metal directly into the edge. Such a solution can be produced very inexpensively. There is no need for a costly machining of a valve seat.

One embodiment provides that the piston is sleeve-like with a hollow-cylindrical piston casing and a piston base closing the piston on one side, wherein the spring is axially surrounded by the piston casing and supported axially inside the piston on the piston base. The piston is preferably made of sheet metal. The piston base is correspondingly thin-walled. Compared to solid pistons, there is thus more axial installation space available for the spring since the interior of the piston is also available as installation space for the spring. As a result, more options are available for the selection and design of the spring, which can also consist of several springs connected in parallel or in series.

Finally, one embodiment provides that the support element is inserted into a circumferential groove at an end of the valve housing facing away from the first opening and is at least axially supported in the circumferential groove. The securing of the support element on the valve housing in a form-fitting manner prevents from the outset deformations between the valve housing and the support element that can be caused by a press fit. The accuracy of the valve seat is therefore guaranteed in every case. The circumferential groove in the valve housing, which is necessary for the form fit, can easily be introduced into the forming process during the production of the valve housing from sheet metal without additional machining expenditure.

In the context mentioned above, a device for regulating pressures of a fluid in a vehicle transmission is disclosed. The device is formed from a section of a transmission component, from at least a first channel and a second channel and from the valve, and has a device for securing the valve or for position-oriented assembly in the transmission component. In the section of the transmission component, the first channel leads to the first opening and the second opening opens into the second channel. The projection formed on the support element extends radially through the valve housing, engages in a form-fitting manner in a recess in the valve housing, protrudes radially over the outer contour of the valve housing and radially out over the inner contour of the valve seat in the transmission component into a recess in the transmission component. The device for securing a pressure compensation valve in the transmission component is only formed by the projection and the recess and is therefore very simple and inexpensive to produce.

The position-oriented assembly ensures, for example, that the second opening and the second channel are precisely oriented to one another. This is particularly advantageous when, as provided in one embodiment, the first opening and the piston base are arranged coaxially with the valve axis, but the second opening in the valve housing is oriented transversely to the first opening. The form-fitting connection formed by the first projection and the recess between the valve and the transmission component is advantageously formed on a side of the valve housing opposite the second opening, for example, which is a longitudinal groove in the transmission component designed as a housing or transmission shaft.

The second opening is oriented to be transverse to the first opening and is introduced into a valve housing made of sheet metal, preferably by punching. The second opening extends in the axial direction at a radial distance from the valve axis. The center axis of the opening runs in the radial direction perpendicular to the valve axis. The valve housing can be produced easily and inexpensively.

Furthermore, a method for producing a valve is provided:

The valve housing is made from sheet metal by cold forming and punching. A hollow-cylindrical component is thus formed, which is open at one end. The hollow-cylindrical component is characterized in the cylindrical region by at least two wall thicknesses, for example on a drawing step. The wall thickness at the open end is smaller than at the wall section following same in the direction of the valve seat. In addition, the recess for the form-fitting connection and the second opening are introduced by punching and the valve seat is punched and embossed.

The wall section with the smaller wall thickness at the open end of the valve housing is reshaped radially in the direction of the valve axis by roller burnishing or rolling so as to create the circumferential groove. The circumferential groove is limited axially in one direction by the thicker wall section and at the open end by a bent section of the thinner wall section.

After the valve housing and piston are produced, the piston and spring are inserted into the valve housing. Alternatively, the spring is first inserted into the piston until it rests against the piston base and then the piston is inserted together with the spring into the valve housing.

The support element is oriented coaxially to the valve housing in such a way that it is axially opposite the opening for the form-fitting connection.

The support element is inserted into the housing. The prongs of the support element are thus snapped into the circumferential groove of the valve housing.

Insertion or pressing of the valve housing into a transmission component, for example into a transmission shaft or into a transmission housing.

BRIEF DESCRIPTION OF THE DRAWINGS

The valve is described below using an exemplary embodiment. In this case, the valve is designed as a pressure compensation valve and is explained in more detail in a device for regulating pressures of a fluid or a device for securing the valve or pressure compensation valve.

DETAILED DESCRIPTION

Figure 1:
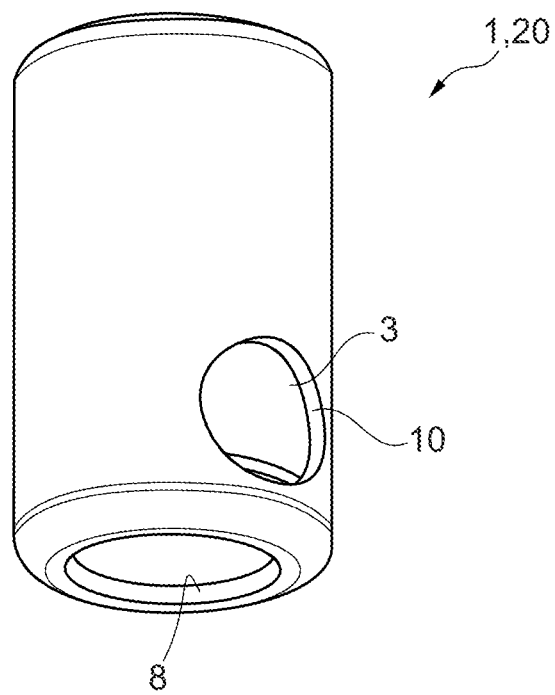
FIG. 1 shows an overall view of a valve designed as a pressure compensation valve.
Figure 2:
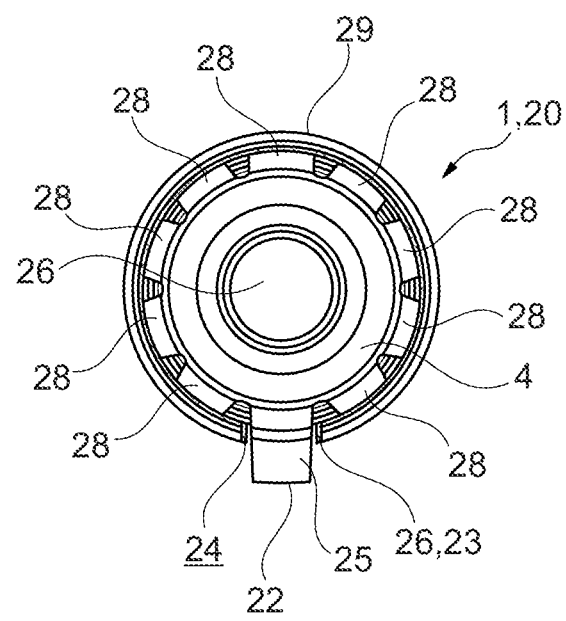
FIG. 2 shows a rear view of the pressure compensation valve according to FIG. 1.

FIG. 1—in the overall view of the pressure compensation valve 1, the valve housing 2 can be seen with a first opening 8, a second opening 10, and behind the second opening 10 in part a piston 3.

FIGS. 2, 3, 4 and 6—a support element 4 is seated in the valve housing 2 on the rear side of the pressure compensation valve 1. The support element 4 is designed to be resilient like a serrated ring, and distributed on the circumference on a base body 62 has a plurality of serrated projections 28, which are axially secured in a form-fitting connection 63 on the valve housing 2. The form-fitting connection 63 is formed by the projections 28 and the circumferential groove 21, wherein the projections 28 engage radially in the circumferential groove 21, i.e., are snapped into place. In addition, the support element 4 is provided with a form-fitting element 22 in the form of a projection 25 which protrudes in the radial direction through a recess 26 formed in the valve housing 2 (see in particular FIG. 2) and beyond the outer contour 29 of the valve housing 2, and with the valve housing 2 forms a form-fitting connection 24 and at the same time forms a form-fitting connection 48 with the recess 43 (see in particular FIG. 4). The support element 4 and the valve housing 2 are secured against each other by the form-fitting connection 24 against rotation about the valve axis 6 and at the same time with the form-fitting connection 48 against rotation of the valve housing 2 around the valve axis 6 with respect to the transmission component 44 (e.g., opposite a transmission shaft or a transmission housing). Alternatively, the valve 20 can be fixed axially in the transmission component 44 with the aid of a form-fitting connection 48 if the part of the projection 25 protruding beyond the outer contour 29 is secured axially on the transmission component 44.

Figure 3:
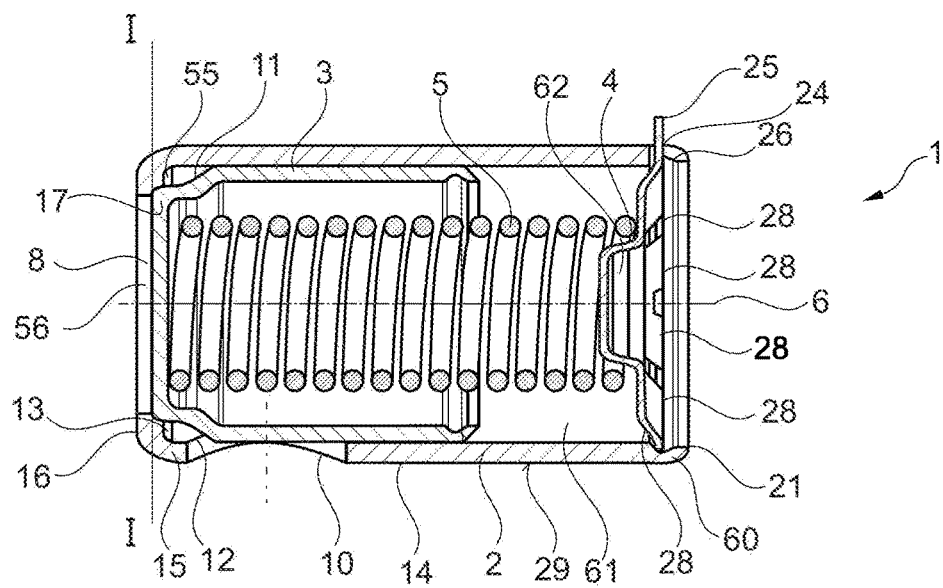
FIG. 3 shows a sectional illustration of the pressure compensation valve in a longitudinal section along the valve axis of the pressure compensation valve, wherein the piston of the pressure compensation valve is in a closed position.
Figure 4:
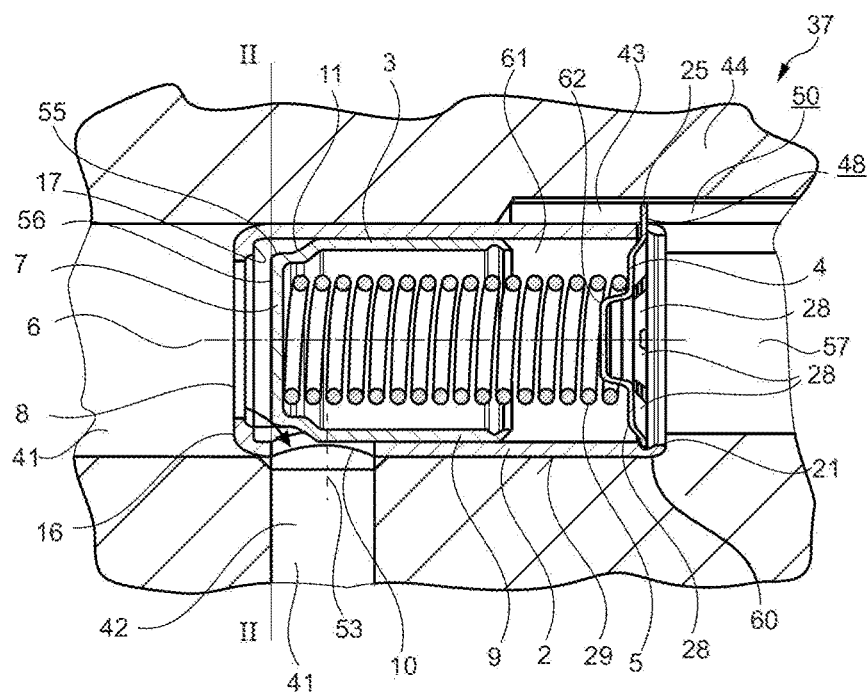
FIG. 4 shows a device for regulating pressures of a fluid in a vehicle transmission having the pressure compensation valve according to FIG. 1 installed therein and a device for securing the pressure compensation valve in a transmission component. The devices and the pressure compensation valve are shown in a longitudinal section along the valve axis of the pressure compensation valve, wherein the piston of the pressure compensation valve is in an open position in the valve housing as shown in FIG. 4.

FIGS. 3 and 4—the pressure compensation valve 1 has a valve housing 2, a piston 3, a support element 4, and a spring 5. The valve housing 2 and the piston 3 are designed to be essentially rotationally symmetrical and are arranged coaxially to a valve axis 6. The valve axis 6 is axially oriented. The piston 3 is axially movable but radially closely guided in the valve housing 2 with little radial play and is provided with a piston casing 9 and a piston base 7. The radial play is preferably 30 μm. The piston casing 9 is designed as a hollow cylinder and is oriented coaxially to the valve axis 6 and extends from the piston base 7 in the direction of the support element 4. The spring 5 is a compression spring and is supported axially in one direction on the piston base 7 of the piston 3 and in the other axial direction on the support element 4 so that the spring 5 is clamped axially between the piston base 7 and the support element 4. The support element 4 engages projections 28 in a circumferential groove 21 of the valve housing 2 and is firmly supported there by the spring action of the support elements. The piston 3 is movable from a closed position I shown in FIG. 3 against the action of the spring forces of the spring 5 into an open position II shown in FIG. 4.

FIGS. 3 and 4—the sleeve-like valve housing 2 is provided with a first opening 8 which is penetrable to fluid and with a second opening 10 on the sleeve casing 14 thereof. The first opening 8 is formed on the head side of the pressure compensation valve 1 on the valve housing 2, is arranged coaxially to the valve axis 6, and is pierced perpendicularly by the valve axis 6. The second opening 10 is oriented to be transverse to the first opening 8, i.e., so that the second opening 10 extends in the axial direction at a radial distance from the valve axis 6. The center axis 53 of the opening 10 runs in the radial direction perpendicular to the valve axis 6. A valve seat 17 is formed on the edge 16 of the valve housing 2 at the first opening 8. The valve seat 17 preferably has a concave, inwardly curved dome-shaped surface which corresponds to a convex annular surface 55 of the piston 3. The piston base 7 is axially adjacent to a transition section 11, at which the piston base 7 merges into the piston casing 9 and the piston casing 9 merges into the piston base 7. The transition section 11 is designed in the form of a concave groove-shaped fillet and connects the piston base 7 to the piston casing 9. The section on the piston base 7 has a smaller outer diameter than does the piston casing 9. The annular surface 55 is adjacent to the surface 56 of the piston base 7 and leads over into the transition section. The surface 56 can be a flat circular surface, as shown, but alternatively also a convex or concave or otherwise three-dimensionally structured surface.

FIG. 3—in the closed position I, the piston 3 is axially pre-tensioned against the valve seat 17 by the action of the spring 5 and in this position closes the first opening 8 with the piston base 7. The closed position I is accordingly the position of the piston base 7 relative to the valve seat 17 in the closed state of the valve 3. The annular surface 55 rests against the valve seat 17 in a sealing manner. In the closed position I of the piston 3, the second opening 10 is largely closed by the piston casing 9, wherein however remains a gap-like through opening 12 which is penetrable to fluid. The gap-like through opening 12 is delimited by the piston casing 9 or by a transition section 11 of the piston 3 and an edge of the valve housing 2 at the second opening 10. The valve chamber 61, which extends on the rear side of the piston surface 56 from the piston base 7 to the end 60 of the valve 20, is sealed off from the first opening 8 by means of the piston 3. An annular gap (leakage gap) formed between the piston casing 9 and the valve housing 2 is not taken into account due to the smaller radial play. In the closed position I, an annular channel 13 is formed between the piston 3 and the valve housing 2, and is delimited by the transition section 11 on the piston 3 and a section 15 of the valve housing 2. The section 15 extends from the valve seat 17 to the hollow-cylindrical sleeve casing 14 of the valve housing 2. The annular channel 13 is open at the gap-like through opening 12 and is otherwise closed all round.

FIG. 4—the device 37 for regulating the pressures of a fluid in a vehicle transmission is formed from at least one section of a transmission component 44, a first channel 41, a second channel 42, the pressure compensation valve 1, and a device 50 for securing the pressure compensation valve 1 in the transmission component 44. The pressure compensation valve 1 is seated in a through bore 57, the diameter of which is the same as that of the first channel 41 or larger or smaller than that of the first channel 41. The first channel 41 leads to the first opening 8. The second opening 10 is oriented to the second channel 42 in such a way that it opens into the second channel 42.

The device 50 for securing the pressure compensation valve 1 in the transmission component 44 is formed by two form-fitting elements 22 and 23, i.e., by the projection 25 of the support element 4 and by a recess 26 in the valve housing 2 and by a recess 43 in the transmission component 44. The radial projection 25 of the support element 4 engages in a form-fitting manner in the recess 26 in the valve housing 2 and forms a form-fitting connection 24 therewith so that the support element 4 and the valve housing 2 are secured against rotation by means of the form-fitting connection 24. In addition, the radial projection 25 extends radially through the valve housing 2 through the recess 26 to such an extent that the radial projection 25 engages in a form-fitting manner in the recess 43 of the transmission component 44 and forms a form-fitting connection 48. The valve 20 is thus secured against rotation about the valve axis 6 in the transmission component 44 via the form-fitting connection 48. In this case, the recess 43 is, for example, a longitudinal groove in a transmission component 44 designed as a housing or a transmission shaft. A device for the positional and position-oriented assembly of the valve 20 in the transmission component 44 is also created via the positions of the recess 43 and the projection 25. This device ensures that when the valve 20 is inserted into the through bore 57, the second opening 10 and the second channel 42 are unequivocally oriented to one another and a connection between the first channel 41 is ensured via the valve 20 and the second channel 42 which is penetrable to fluid.

FIGS. 3 and 4—it is assumed that the pressure compensation valve 1 shown in FIG. 3 is installed in the device 37 in the closed position I of the piston 3. In this position, the force exerted by the pressure of a fluid in the first channel 41 on the surface 56 of the piston base is less than or equal to a counterforce acting inside the pressure compensation valve 1 on the rear of the piston base 7. The counterforce is a result of the force generated by a counter-pressure inside the pressure compensation valve 1 on the rear side of the piston base 7 and primarily the spring force exerted on the rear side of the piston base 7 of the spring 5 clamped between the piston base 7 and the support element 4.

FIG. 4—when the pressure in the first channel 41 rises to such an extent as to exceed the resulting counterforce on the surface 56 of the piston base 7, the piston 3 moves axially in the direction of the support element 4 into the open position II and releases the valve seat 17. The open position II is at the position of the piston 3 in which the first opening 8 is released by the piston. The fluid flows through a passage 18 that has been released in this way and marked with the thick arrow, via the first opening 8, through the interior of the pressure compensation valve 1, via the second opening 10, into the second channel 42. In this case, the piston 3, which is subject to a leakage gap predetermined by the radial play, also seals the rear side of the pressure compensation valve 1 at the open cross-section 61 of the end 60 thereof.

Figure 5:
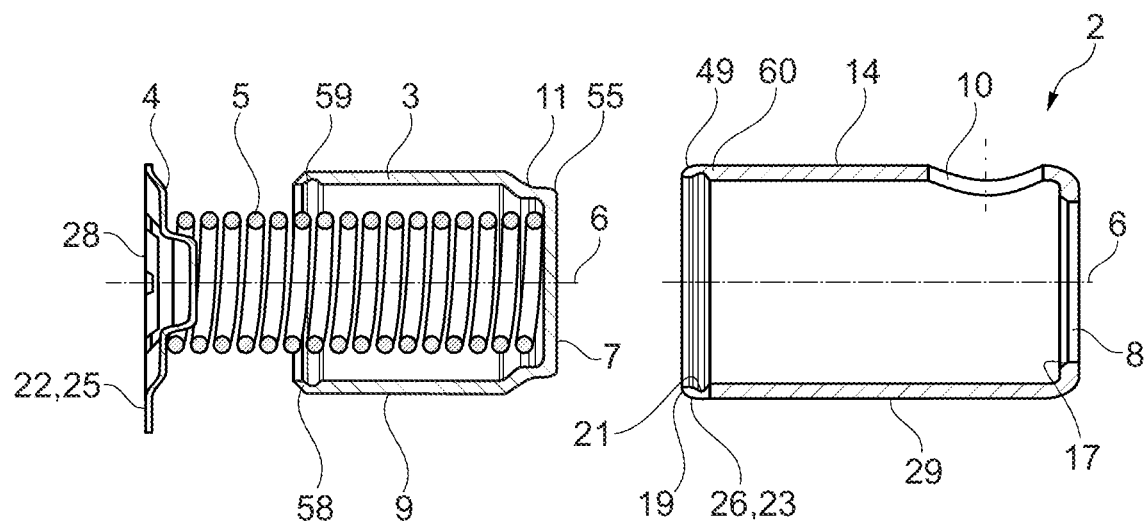
FIG. 5 shows an intermediate stage of a method in which the valve housing is shown as a single part in a longitudinal section along the valve axis and a pre-assembly unit formed from the piston, the spring, and the support element for a further assembly.
Figure 6:
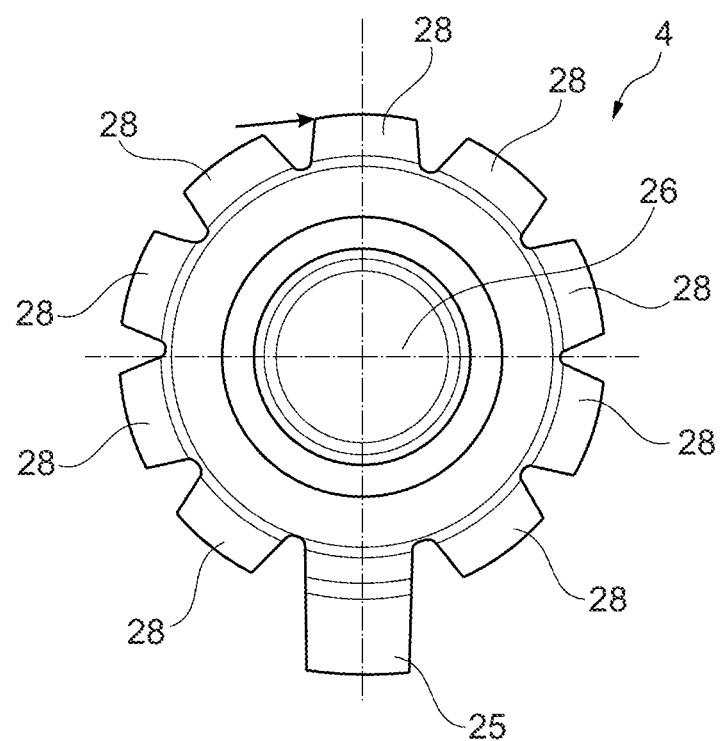
FIG. 6 shows an overall view of the support element 4.

FIG. 5—The valve housing 2 and the piston 3 are sleeve-like components which are preferably cold-formed from flat sheet metal material, i.e., drawn and punched. The valve housing 2 is first drawn as a cup. The cup initially has a closed bottom and, after drawing, optionally an edge which surrounds the open end 60 of the cup like the brim of a hat. The sleeve has two cylindrical regions on the inside. One of the cylindrical regions describes the inner circumferential surface of the valve housing 2, on which the piston 3 is radially centered and guided to be axially movable. The second cylindrical region describes an intermediate stage of the process. The diameter of this cylindrical region is larger than that of the aforementioned inner peripheral surface. The wall thickness of the sleeve is correspondingly thinner in this region at the open end 60 of the sleeve or of the valve housing 2. When the valve housing 2 is completed, the base thereof is perforated and punched so that the first opening 8 with the valve seat 17 is created. The second opening 10 is punched transversely. In addition, the recess 26 for the engagement of the form-fitting element 22 is cut out. The open end 60 of the sleeve is trimmed if necessary, wherein the initially mentioned edge which resembles the brim of a hat is cut off. This creates a continuous outer cylindrical outer contour 29 of the valve housing 2. When the end 60 is trimmed, any burrs that might arise are leveled out when a chamfer 49 is formed, through which the initially cylindrical region 19 with the larger inner diameter is deformed. The chamfer 49 is produced by flanging or folding over the second region 19 at the open end 60 of the sleeve, wherein the chamfer 49 is formed on the outside and the circumferential groove 21 on the inside.

The piston 3 is initially drawn as a cup during the production thereof. In the process, the convex annular surface 55 is embossed and the transition section 11 axially adjacent to the piston base 7 is drawn. At the transition section 11, the piston base 7 merges into the piston casing 9 and the piston casing 9 merges into the piston base 7. At the open end, if necessary in an intermediate stage of the production method, the cup has an edge in the manner of the brim of a hat and an initially hollow-cylindrical region 58, the wall thickness of which is less than that of the piston casing 9. A chamfer 59 is formed from the hollow-cylindrical region 58, which ensures that no sharp edges or protrusions remain at the open end of the piston 3 after the production thereof. For example, trimming the open end and removing the edge levels out any burrs that might arise when a chamfer 59 of the piston 3 is formed.

Using the constellation shown in FIG. 5, the method for producing a valve 20 can be understood with the following steps:

Producing the valve housing 2 from sheet metal by cold forming and punching as a hollow-cylindrical component which is open at least at one end 19. During cold forming, a wall section 27 running around an axis of symmetry 6 of the valve housing 2 is produced at the open end 19. This radially directed wall thickness S1 is smaller than the wall thickness S2 of a sleeve casing 14 of the valve housing 2 which follows the wall section 27 axially in the direction of the first opening 8 and is hollow-cylindrical towards the valve axis 6. During the punching, a recess 26 is introduced in the valve housing 2, which is a decisive part of the form-fitting connection.

Shaping the circumferential groove 21, wherein the wall section 27 is bent radially inward at the open end 19 by roller burnishing or flanging in such a way that a circumferential groove 21 open to the axis of symmetry is formed on the valve housing 2. The circumferential groove 21 in any longitudinal sections through the valve housing 2, which are imaginary thus guided along the valve axis 6, is delimited axially in one direction by body edges of the sleeve casing 14 and in the other axial direction by the free end 19 bent in the direction of the axis of symmetry.

Centering the spring 5 on the cup-shaped base body 62 of the support element 4,

Inserting the piston 3 into the valve housing 2, introducing the spring 5, and thereby orienting the support element 4 with the valve axis 6 and thus orienting at least the form-fitting element 22 designed as a projection 25 with the second form-fitting element 23 designed as the recess 26;

Pressing the support element 4 into the valve housing 2 and thus fastening the support element 4 by snapping it into the circumferential groove 21.

LIST OF REFERENCE SYMBOLS

1 Pressure compensation valve
2 Valve housing
3 Piston
4 Support element
5 Spring
6 Valve axis
7 Piston base
8 First opening
9 Piston casing
10 Second opening
11 Transition section
12 Gap-like through opening
13 Annular channel
14 Sleeve casing
15 Section of the valve housing
16 Edge 17 Valve seat
18 Passage
19 Region
20 Valve
21 Circumferential groove
22 First form-fitting element
23 Second form-fitting element
24 Form-fitting connection
25 Projection
26 Recess
27 Wall section
28 Projection of the support element
29 Outer contour of the valve housing
37 Device
41 First channel
42 Second channel
43 Recess
44 Transmission component
48 Form-fitting connection
49 Chamfer
50 Device
53 Center axis
55 Annular surface
56 Surface
57 Through bore
59 Chamfer
60 End
61 Valve chamber
62 Base body
63 Form-fitting connection

The invention claimed is:

1. A valve comprising: a valve housing, a piston, a support element, and a spring, wherein:
   the piston and the valve housing are arranged coaxially to one another on a valve axis, wherein the valve axis is oriented in a first axial direction and in a second axial direction opposite to the first axial direction,
   the piston is received in the valve housing so as to be axially movable against spring forces of the spring, wherein the spring is supported at least in the first axial direction on the support element and in the second axial direction on the piston,
   the piston is formed in sleeve-like manner with a hollow-cylindrical piston casing and a piston base closing the piston on one side,
   the spring is axially surrounded by the piston casing and is supported axially inside the piston on the piston base,
   the valve housing is provided with a first opening which is penetrable to fluid and which can be closed by the piston base,
   the valve housing is provided with a second opening which can be at least partially closed by the piston casing and which is penetrable to the fluid,
   the piston casing extends outwards from the piston base axially in the direction of the support element and thus surrounds the valve axis,
   the first opening and the piston base are arranged coaxially with the valve axis, and
   the second opening is oriented transverse to the first opening in the valve housing.

2. The valve according to claim 1, wherein the piston is guided in an axially movable manner in the valve housing and is radially centered in the valve housing by the piston casing.

3. The valve according to claim 1, wherein the piston is guided in an axially movable manner in the valve housing against the spring forces of the spring from a closed position into an open position axially remote from the closed position, wherein in the closed position of the piston the first opening is closed by the piston, and wherein the first opening in the open position of the piston base is released by the piston to be penetrable, wherein in the open position a passage for the fluid is formed through the valve housing via the first opening and the second opening, wherein, however, the piston at least partially closes an open cross section of the valve housing opposite the first opening axially at an open end of the valve housing.

4. The valve according to claim 3, wherein the second opening in the closed position is only partially closed by the piston casing such that a gap-like through opening of the second opening which is penetrable to the fluid is not covered by the piston casing and is not closed by the piston.

5. The valve according to claim 3, wherein an annular channel adjacent to the piston base is formed between the piston and the valve housing in the closed position.

6. The valve according to claim 3 wherein the piston base and the piston casing are connected to one another by means of a transition section formed on the piston, wherein an annular channel is delimited at least in the closed position by the transition section and a section of the valve housing opposite the transition section.

7. The valve according to claim 3, wherein between the piston and the valve housing in the closed position an annular channel is defined which is open at a gap-like through opening and otherwise delimited by sections of the piston and a section of the valve housing.

8. The valve according to claim 1, wherein the valve housing is a sleeve-like valve housing which has a sleeve casing that is oriented concentric to the valve axis and has an edge which is oriented radially in the direction of the valve axis and which extends around the first opening, wherein the edge is provided with a valve seat and wherein the piston in a closed position rests sealingly against the valve seat in a manner axially pre-tensioned by the spring.

9. The valve according to claim 1, wherein the support element is inserted into a circumferential groove at an end of the valve housing facing away from the first opening, and is at least axially supported in the circumferential groove, wherein the spring is supported at least axially on the support element.

10. The valve according to claim 8, wherein the valve housing is made of sheet metal and is cold-formed and punched.

11. A method for producing a valve according to claim 1, comprising:
   producing the valve housing from sheet metal by cold forming as a hollow-cylindrical component which is open at least at one end, wherein at least one recess is introduced into the valve housing by punching;
   shaping a circumferential groove, wherein a region at the end of the valve housing is bent in such a way that the circumferential groove open towards the valve axis;
   inserting the piston and the spring into the valve housing;
   orienting the support element relative to the valve axis and orienting at least one first form-fitting element relative to a second form-fitting element designed as a recess; and
   pressing the support element into the valve housing and thus fastening the support element by snapping it into the circumferential groove.

12. A device for regulating pressures of a fluid in a vehicle transmission, wherein the device is formed from a section of a transmission component, from at least a first channel and a second channel, as well as from a valve designed as a pressure compensation valve according to claim 2, and a device for securing the valve in the transmission component, wherein the first channel in the section of the transmission component leads to a first opening of the valve housing which is penetrable to fluid, and a second opening of the valve housing which is penetrable to fluid opens into the second channel, wherein a projection engages in a form-fitting manner in a recess of the transmission component.

13. The device according to claim 12, wherein the first opening and the piston base are arranged coaxially with the valve axis and the second opening in the valve housing is thus oriented transverse to the first opening, wherein a form-fitting connection formed at least from the projection and the recess is configured between the valve and the transmission component on a side of the valve housing opposite the second opening.

14. A device for securing a pressure compensation valve according to claim 12 in the transmission component, wherein the device is formed at least by the projection and the recess.

15. The valve according to claim 1, wherein the piston is made of sheet metal and is cold-formed.

16. A valve comprising: a valve housing, a piston, a support element, and a spring, wherein:
the piston and the valve housing are arranged coaxially to one another on a valve axis, wherein the valve axis is oriented in a first axial direction and in a second axial direction opposite to the first axial direction,
the piston is received in the valve housing so as to be axially movable against spring forces of the spring, wherein the spring is supported at least in the first axial direction on the support element and in the second axial direction on the piston,
the valve housing is provided with a first opening which is penetrable to fluid and which can be closed by a piston base of the piston,
the valve housing is provided with a second opening which can be at least partially closed by a piston casing of the piston and which is penetrable to the fluid,
the piston casing extends outwards from the piston base axially in the direction of the support element and thus surrounds the valve axis,
the first opening and the piston base are arranged coaxially with the valve axis,
the second opening is oriented transverse to the first opening in the valve housing, and
an annular channel adjacent to the piston base is formed between the piston and the valve housing in the closed position.

17. The valve according to claim 16, wherein the second opening in the closed position is only partially closed by the piston casing such that a gap-like through opening of the second opening which is penetrable to the fluid is not covered by the piston casing and is not closed by the piston.

18. The valve according to claim 16 wherein the piston base and the piston casing are connected to one another by means of a transition section formed on the piston, wherein the annular channel is delimited at least in the closed position by the transition section and a section of the valve housing opposite the transition section.

19. The valve according to claim 16, wherein the annular channel is open at a gap-like through opening and otherwise delimited by sections of the piston and a section of the valve housing.

* * * * *